United States Patent [19]

Piasecki

[11] Patent Number: 5,393,015
[45] Date of Patent: Feb. 28, 1995

[54] ROTARY WING AIRCRAFT IN-FLIGHT REFUELING DEVICE

[75] Inventor: Frank N. Piasecki, Haverford, Pa.

[73] Assignee: Piasecki Aircraft Corporation, Essington, Pa.

[21] Appl. No.: 70,535

[22] Filed: Jun. 1, 1993

[51] Int. Cl.⁶ .............................................. B64D 39/00
[52] U.S. Cl. ................................................ 244/135 A
[58] Field of Search ................. 244/135 A, 161, 17.19

[56] References Cited

U.S. PATENT DOCUMENTS 2,859,002  11/1958  Leisy ................................. 244/135 A
3,091,419   5/1963  Mosher ............................. 244/135 A

*Primary Examiner*—Michael S. Huppert
*Assistant Examiner*—Anne E. Bidwell
*Attorney, Agent, or Firm*—Willard M. Hanger

[57] ABSTRACT

An elongated, rigid boom for the in-flight refueling of rotary wing aircraft in which a forward end of the boom is adapted for attachment to the fuselage of a rotary wing tanker aircraft and is of sufficient length to extend rearwardly of the tanker aircraft for the rear end of the boom to be clear of the tanker aircraft rotor path. The forward end of a funnel refueling drogue configured to receive the fueling probe of an aircraft to be refueled is swively attached to the rear end of the rigid boom and a fuel line supported by the boom extends from a connection into the tanker aircraft refueling tanks to a female refueling aircraft probe connection in the drogue. Pressurized air flowing within the boom is discharged from a downwardly directed nozzle and selectively from outwardly facing nozzles on each side of the boom adjacent the boom rear end with the nozzles being configured to establish a volume rate discharge as creates a vertical lifting force on the boom compensating for gravity and rotor downwash and boom side forces selectively directed horizontally outwardly in either direction for establishing yaw control of the boom.

18 Claims, 2 Drawing Sheets

ROTARY WING AIRCRAFT IN-FLIGHT REFUELING DEVICE

BACKGROUND OF THE INVENTION

This invention relates to an airborne device for refueling rotary wing aircraft. The airborne refueling of helicopters to date has been limited to operations in which the forwardly projecting fueling probe of a helicopter can engage the flexible hose drogue trailing behind a fixed wing tanker aircraft capable of flying at a minimum control speed in the range of the maximum speed of the helicopter. Fixed wing tanker aircraft, in general, other than the C-130 of marginal capability, cannot maintain a minimum control speed within the maximum speed range of most helicopters.

Even when a fixed wing tanker aircraft capable of controlled flight within the speed range of helicopters is available, the helicopter must discontinue its slow speed operational activities for the considerable time period that is required to make refueling engagement with the fixed wing tanker aircraft and take on a full fuel load before returning to its slow speed operational activity. If a fixed wing tanker aircraft of sufficiently low speed characteristics is not available for refueling, the helicopter must then land to refuel or pick up containers and manually refuel in flight before returning to its slow speed operational activity.

This loss of productive mission time on station for helicopters engaged in continuous slow speed missions, such as mine sweeping, requires that additional helicopters equipped for the slow speed mission be assigned than would be necessary were the helicopters capable of being refueled while operating at the slow speed required for conducting its mission. Heretofore, helicopters have not been figured as tanker aircraft due to the problem of maintaining a safe clearance distance between the rotor blades of the respective aircraft during the refueling operation, as well as the problem of keeping a conventional flexible hose drogue trailing behind a tanker aircraft free of the tanker aircraft rotor blade path.

SUMMARY OF THE INVENTION

The invention comprises a rigid refueling boom attachable to and extending rearwardly from the after end of a tanker refueling helicopter, preferably a rear ramp configured helicopter, a sufficient distance that a refueling drogue swivelly connected to the outer rear end of the rigid boom is clear of both the tanker helicopter rotor and the rotor of the refueling helicopter while being refueled. A fuel line extending from a connection into the tanker aircraft refueling tanks to a fueling probe connection in the drogue is supported along its length by the boom. Aerodynamic stabilizing control forces are provided at the outer end of the boom to reduce deflection of the boom due to gravity, the downwash produced by the helicopter rotors and other externally applied forces. The stabilizing forces are provided by gaseous jets directed downwardly from the boom adjacent its outer rear end for gravity and rotor downwash compensation and directed horizontally outwardly from either one of selected opposite sides of the boom adjacent its rear end for yaw control.

An object of the invention is to provide a device whereby a tanker rotary wing aircraft can refuel other aircraft while in flight.

Another object of the invention is to provide a device by which in-flight refueling of a rotary wing aircraft can be conducted while the rotary wing aircraft is engaged in a slow speed flight mission.

A further object of the invention is to configure a rotary wing aircraft as a tanker aircraft for the in-flight refueling of another rotary wing aircraft while conducting slow speed towing operations.

A yet further object of the invention is to provide an elongated, cantilever supported refueling device extending rearwardly of the rotor of a tanker rotary wing aircraft that is stabilized to counteract gravity and in-flight deflecting forces.

DETAILED DESCRIPTION OF THE INVENTION

Figure 1:
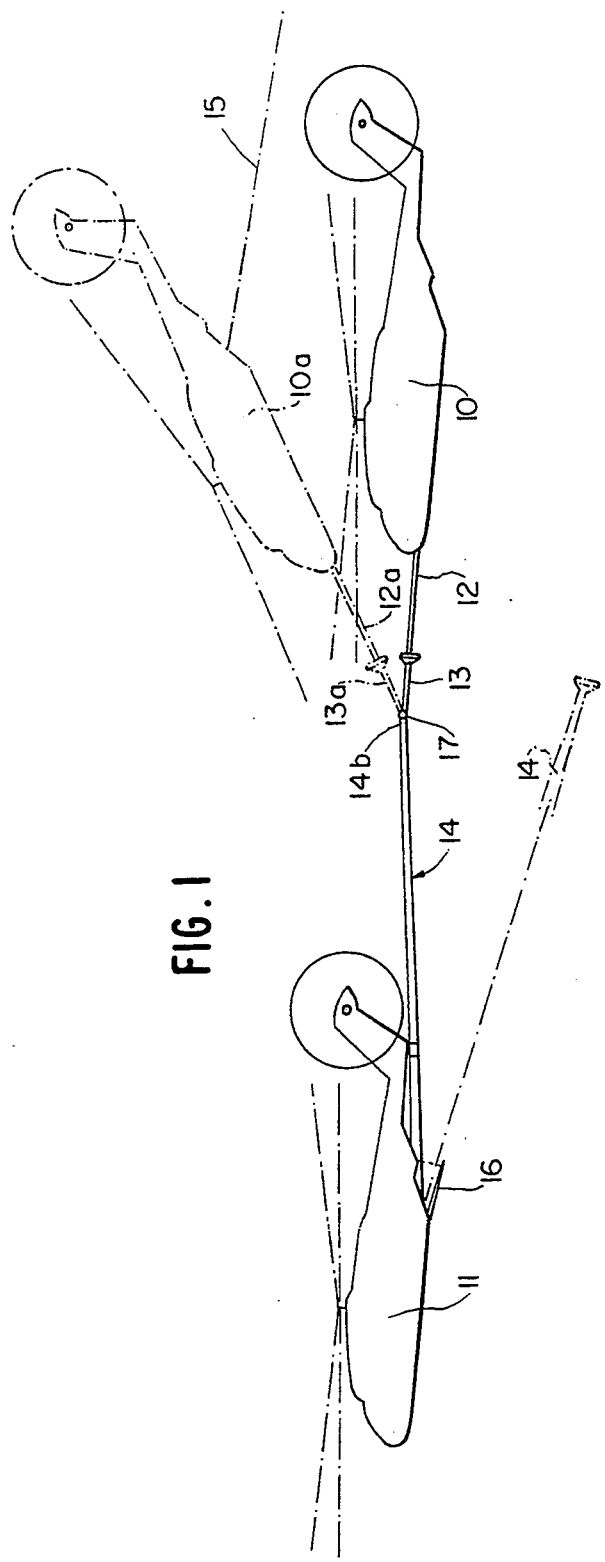
FIG. 1 is an illustration of a rotary wing aircraft being refueled in flight from a rotary wing tanker aircraft by means of the cantilever supported refueling device of the invention.

FIG. 1 is illustrative of the typical relative positions of a rotary wing aircraft 10 being refueled while operating at a normal cruising speed by a tanker rotary wing aircraft 11 utilizing the present invention comprising an elongated, rigid, cantilever supported refueling boom 14, hereafter referred to as air boom 14, that extends rearwardly from the opened ramp door 16 at the rear of the fuselage of the tanker aircraft 11. The rear, outer end 14b of the air boom 14 is swivelly connected by a centering biased universal joint 17 to a trailing funnel refueling drogue 13 of low friction material into the open rear end of which the forwardly extending, rigidly mounted fueling probe 12 of the refueled aircraft 10 can enter for engagement into a female connection to the outer end of a fuel carrying line extending along the air boom 14 to a connection into the tanker aircraft fuel tanks. The dashed line representation 10a of a helicopter being refueled while towing a load is illustrative of an important aspect of the air boom invention. The helicopter 10a attached by a tow line 15 to a towed load (not illustrated), such as a mine sweeping device, can continue with its towing mission in a sharply forwardly tilted attitude with its fueling drogue 12a inserted into the drogue 13a of the air boom while being refueled. The full line illustration of the air boom 14 represents the maximum upper position of the air boom and the partial dashed line illustration of the air boom represents its maximum lowered position as it extends rearwardly out of the opened ramp of the tanker aircraft 11.

Figure 2:
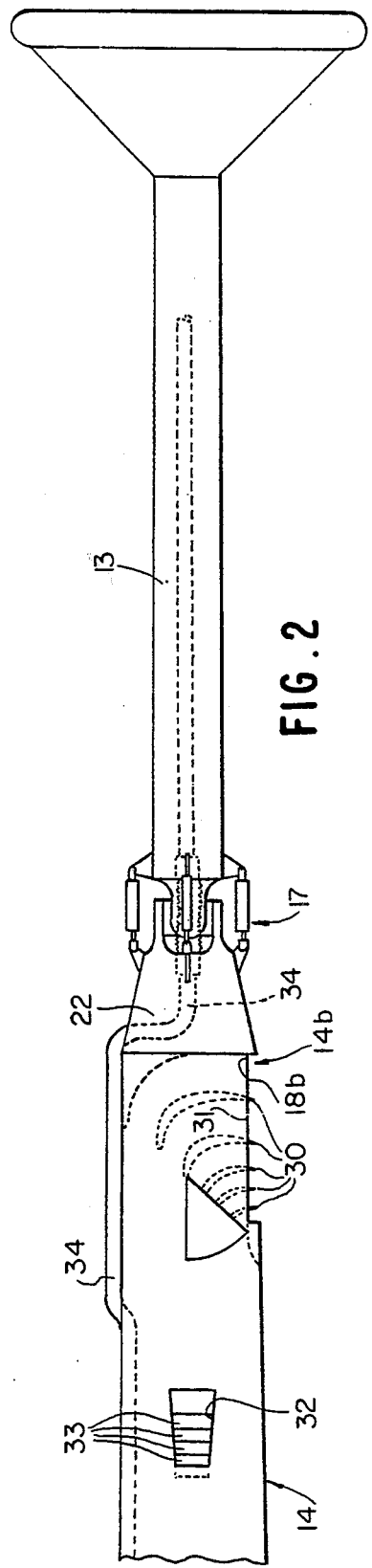
FIG. 2 is a side elevation of the rear portion of the cantilever supported fueling device of the invention.
Figures 3, 4:
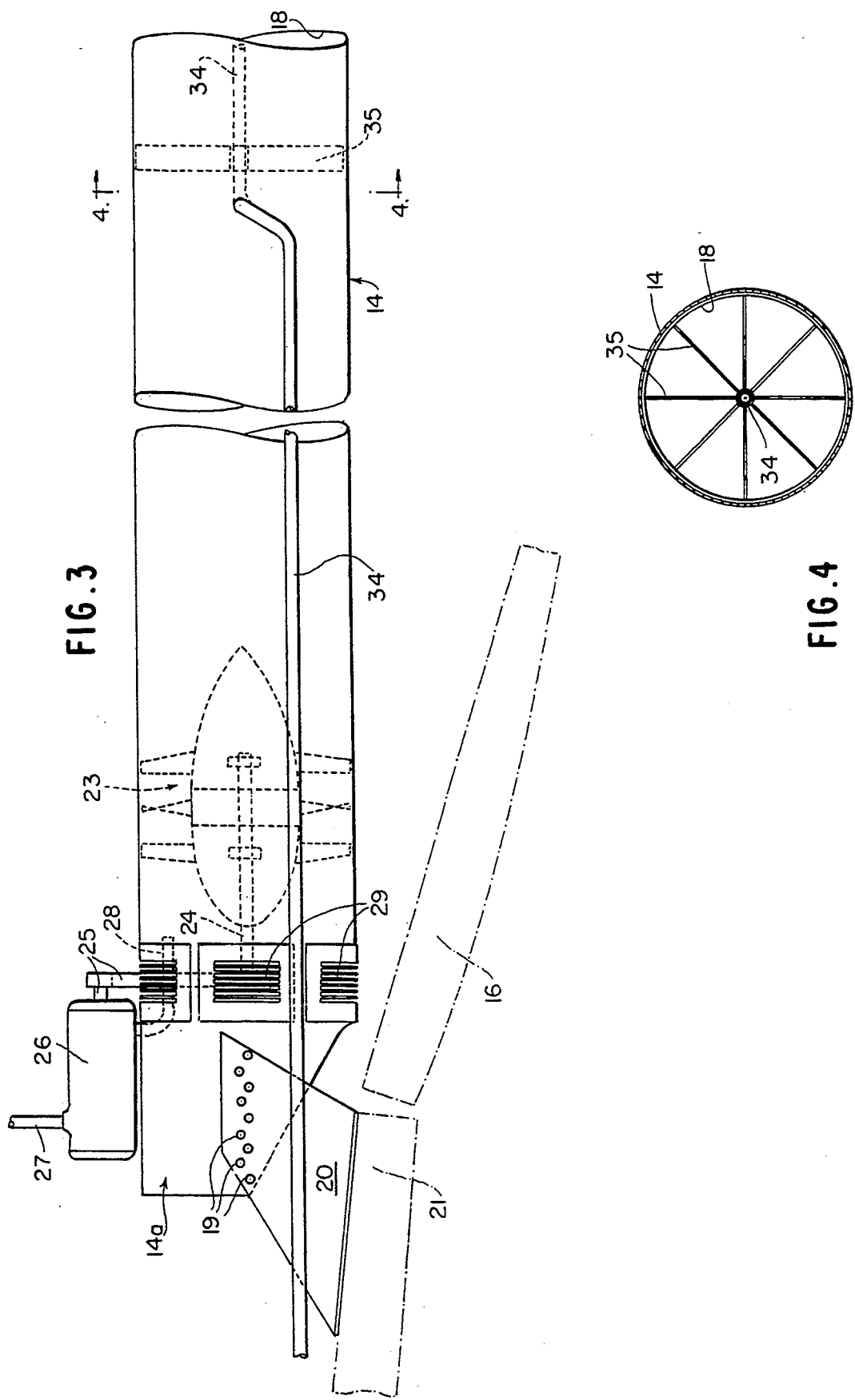
FIG. 3 is a side elevation of the forward portion of the fueling device of the invention.
FIG. 4 is a cross section at section 4—4 of FIG. 3.

FIGS. 2, 3 and 4 illustrate a preferred one of several possible embodiments of the elongated, cylindrical air boom 14 along the interior of which a hollow tube 18 extends substantially the length of the air boom 14 with the forward end 14a of the air boom affixed by bolts or rivets 19 to a vertical support 20 extending above the floor 21 of the tanker aircraft 11. Alternatively, the forward portion 14a of the air boom could be pivotally attached to the aircraft fuselage to be rotatable vertically or transversely of the aircraft fuselage. Referring to FIG. 2, a hood 22 encompassing the rear end 14b of the cylindrical air boom 14 and enclosed tube 18 is swivelly connected by the spring centered universal joint 17 to the forward end of the funnel drogue 13, thereby permitting the swivel connected drogue 13 to move off center of the air boom axis as necessary in accommodating the entry and fueling connection of the refueling probe 12 of the refueling helicopter of which the fuselage attitude might be markedly different from that of the tanker aircraft, as illustrated by the dashed line representations of the refueling helicopter 10a and the probe 12a of FIG. 1. By means of the subsequently described embodiment, illustrated in FIGS. 2-4, provisions are made in the lower portion of the air boom 14 immediately adjacent its rear end 14b for discharging a downwardly directed gaseous jet of sufficient volume and velocity as provides a vertical stabilizing force that reduces vertical deflection of the cantilever supported air boom 14 due to gravity and the downwardly directed forces from rotor downwash. Also provisions are provided for the horizontal discharge of gaseous jets in selected directions transversely of the air boom 14 adjacent its rear end for providing horizontally directed forces that reduce transverse deflections of the cantilever supported air boom created by exterior applied forces. Various sources and arrangements, other than that described herein with respect to FIGS. 2-4, could provide the source for the stabilizing gas jets discharged from the rear portion of the air boom, such as jet discharges from an independent source of compressed gas or air stored in the tanker aircraft or compressed air bled from the tanker aircraft turbines directly into the air boom.

Referring now to FIG. 3, a variable blade pitch, constant speed or fixed blade pitch variable speed fan 23 is mounted for rotation concentrically within the interior of the air boom hollow tube 18 adjacent its forward end. In the illustrated embodiment, the ducted fan 23 is powered by shafts 24, 25 driven by an air motor 26 receiving compressed air through a connection 27 from the tanker aircraft turbine compressor (not illustrated), the air motor exhausting through the exhaust line 28 into the air boom interior. Outside air entry vents 29 are spaced around the periphery of the air boom 14 and the hollow tube 18 forwardly of the ducted fan 23.

Referring now to FIG. 2, vanes 30 arranged at the rear end 18b of the air boom hollow tube above a bottom opening 31 in the air boom and hollow tube turn the air flow generated by the ducted fan 23 along the interior of the hollow tube 18 within the air boom downwardly in establishing an upwardly directed stabilizing force at the rear end of the air boom 14. The vanes can be pivotally mounted for controlling the direction of discharge of the air and the degree of lifting force that is applied to the air boom. Side slots 32 are provided along a portion of each of the two opposite sides of the air boom 14 and hollow tube 18 immediately forwardly of the bottom opening 31. Side vanes 33 interiorly of the slots 32 direct the air flow within the tube 18 outwardly, selectively transversely of either side of the air boom and open and close the respective side slots 32 for providing left or right stabilizing yaw forces of the desired degree on the air boom. The vertical and transverse side forces created by the air discharged through the bottom opening 31 and the side slots 32 can be controlled by controlling the blade pitch of a controllable pitch, constant speed ducted fan 23 or by controlling the speed of a variable speed, constant pitch ducted fan 23.

A fuel line 34 connected at its forward end through suitable valving to the tanker aircraft fuel tanks is supported along its length by the air boom 14 and extends through the hood 22 into the interior of the drogue 13 as illustrated in FIGS. 2-4, the forward portion of the fuel line lying externally along the side of the air boom 14 with the central portion being supported internally along a central portion of the air boom tube 18 by a series of cross braces 35 in the manner illustrated in FIGS. 3 and 4, the rear portion of the fuel line 34 being routed externally of the air boom 14 through the closure hood 22 at the rear end of the air boom and terminating at a female fuel connection in the drogue 13. The fuel line routing illustrated in FIGS. 2-4 is highly optional and subject to many variations.

Fuel line valve controls and operator controls for establishing air boom vertical lift support and yaw forces created by the volume rate at which air is discharged vertically and transversely at the rear end of the air boom 14 can conveniently be located at the after end of the tanker helicopter adjacent the cargo ramp opening. As previously noted, the illustrated and described ducted fan arrangement in which air flow from the ducted fan along the tube interior of the air boom is deflected downwardly through the air boom bottom opening or deflected selectively transversely by the side slots, is one preferred embodiment. The same effect and results could be obtained by providing a flow of compressed air by various arrangements to a vertically downwardly directed orifice or orifices selectively directed transversely adjacent the end of the air boom 14.

It should be understood that the foregoing disclosure illustrates one typical preferred embodiment of the invention and that numerous modifications or alterations may be made therein without departing from the spirit and scope of the invention as set forth in the appendant claims.

What is claimed is:

1. A fuel transfer device for in-flight refueling of a rotary wing aircraft from a rotary wing tanker aircraft comprising:

an elongated, rigid boom having a forward end and a rear end, said boom forward end being adapted for connection to fuselage structure of said tanker aircraft with said boom projecting exteriorly of said tanker aircraft and supported as a cantilever, a funnel refueling drogue having an interior configured to receive a fueling probe of said refueling aircraft, swiveling means connecting a forward portion of said drogue to said boom rear end, fuel conduit means supported by and extending along said boom between a forward end portion of said conduit means adapted for connection to a fuel system of said tanker aircraft and a rear end portion contained within said drogue coterminous with a female connection for said fueling aircraft probe, means establishing a gaseous jet discharge directed outwardly from and transversely of said boom adjacent said boom rear end and means controlling the volume rate of said gaseous jet discharge, whereby a controllable position stabilizing force is applicable to said cantilever supported boom.

2. The fuel transfer device of claim 1 wherein said gaseous jet discharge establishing means comprises means directing a gaseous jet discharge vertically downwardly from said boom, whereby a controllable, vertically upwardly directed lifting force is applicable to said cantilever supported boom.

3. The fuel transfer device of claim 1 wherein said gaseous jet discharge establishing means comprises:
    means directing a gaseous jet discharge vertically downwardly from said boom and
    means directing a horizontally extending jet discharge of gas outwardly from each opposite side of said boom;
    and wherein said means controlling the volume rate of said gaseous discharge comprises:
    means controlling the volume rate of said downwardly directed gas discharge and the volume rate of said horizontally extending gas discharge from each said boom opposite side.

4. The fuel transfer device of any one of claims 1–3 wherein said gaseous jet discharge establishing means comprises:
    means associated with said boom providing a source of pressurized gas and
    nozzle means integral with said boom adjacent said boom rear end having a connection to said pressurized gas source and including orifice means for establishing a jet discharge of said pressurized gas outwardly and transversely of said boom.

5. The fuel transfer device of claim 2 wherein said boom is an elongated cylinder having a hollow interior closed at said boom rear end and said means establishing said vertically downwardly directed gaseous jet discharge comprises:
    means providing a source of gas under pressure within said boom hollow interior and
    an orifice in the bottom portion of said hollow boom adjacent said boom rear end and configured to discharge said pressurized gas from said boom interior as a jet discharge of a velocity and volume as establishes a vertically upwardly directed force on said boom.

6. The fuel transfer device of claim 5 wherein said means controlling the volume rate of said gas jet discharge includes means controlling the pressure of said pressurized gas provided within said boom hollow interior.

7. The fuel transfer device of claim 5 wherein said pressurized gas providing means includes a source of pressurized air generated from high pressure air bled from turbine propulsion means of said tanker aircraft.

8. The fuel transfer device of claim 3 wherein said boom is an elongated cylinder having a hollow interior closed at said boom rear end and said gaseous jet discharge establishing means includes means providing a source of gas under pressure within said boom hollow interior,
    said vertically downwardly directed gaseous jet discharge means including an orifice in the bottom portion of asid hollow boom adjacent said boom rear end and configured to discharge said pressurized gas from said boom interior as a jet discharge of a velocity and volume as establishes a vertically upwardly directed force on said boom,
    said horizontally extending gaseous jet discharge means including an orifice in each opposite side portion of said hollow boom adjacent said boom rear end and configured to discharge said pressurized gas from said boom interior as jet discharges of a velocity and volume as establishes horizontally extending forces directed outwardly and and transversely of said boom and wherein
    said means controlling the volume rate of said horizontally extending gas discharge includes means selectively opening and closing each said oppositely located side orifice.

9. The fuel transfer device of claim 8 wherein said means controlling the volume rate of said vertically and horizontally directed gas jet discharges includes means controlling the pressure of said pressurized gas provided within said boom hollow interior.

10. The fuel transfer device of claim 9 wherein vanes extending into the interior of said hollow boom are associated with each said orifice and shaped in a manner as directs said pressurized gas within said boom interior outwardly through an associated orifice.

11. A fuel transfer device for in-flight refueling of a rotary wing aircraft from a rotary wing tanker aircraft comprising:
    an elongated hollow boom having a forward end and a closed rear end,
    said boom forward end being adapted for connection to fuselage structure of said tanker aircraft with said boom projecting exteriorly of said tanker aircraft and supported as a cantilever,
    a funnel refueling drogue having an interior configured to receive a fueling probe of said refueling aircraft,
    swiveling connecting means connecting a forward portion of said drogue to said boom rear end,
    fuel conduit means supported by and extending along said boom between a forward end portion of said conduit means adapted for connection into a fuel system of said tanker aircraft and a rear end portion contained within said drogue coterminous with a female connection for said fueling aircraft probe,
    a bladed fan mounted for rotation concentrically within said hollow boom interior rearwardly of an opening into said hollow boom forward end,
    means rotating said bladed fan establishing a source of high pressure air contained within said boom interior,
    an orifice opening in a bottom section of said boom adjacent said boom rear end and configured to discharge said boom contained pressurized air at a volume rate as establishes a vertically upwardly directed force on said boom and
    means controlling the volume rate of air discharged through said bottom orifice.

12. The fuel transfer device of claim 11 wherein said air volume rate control means comprises means controlling the air pressure generated by rotation of said fan.

13. The fuel transfer device of claim 12 wherein said fan has fixed pitch blades and
    said air volume rate control means comprises means controlling the speed of said fan rotating means.

14. The fuel transfer device of claim 12 wherein said fan has controllable pitch blades,
    said fan rotating means operates at a constant speed and
    said air volume rate control means comprises means for controlling the pitch of said fan blades.

15. A fuel transfer device for in-flight refueling of a rotary wing aircraft from a rotary wing tanker aircraft comprising:
    an elongated hollow boom having a forward end and a closed rear end, said boom forward end being adapted for connection to fuselage structure of said tanker aircraft with said boom projecting exteriorly of said tanker aircraft and supported as a cantilever, a funnel refueling drogue having an interior configured to receive a fueling probe of said refueling aircraft, swiveling connecting means connecting a forward portion of said drogue to said boom rear end, fuel conduit means supported by and extending along said boom between a forward end portion of said conduit means adapted for connection into a fuel system of said tanker aircraft and a rear end portion contained within said drogue coterminous with a female connection for said fueling aircraft probe, a bladed fan mounted for rotation concentrically within said hollow boom interior rearwardly of an opening into said hollow boom forward end, means rotating said bladed fan establishing a source of high pressure air contained within said boom interior, an orifice opening in a bottom section of said boom adjacent said boom rear end and configured to discharge said boom contained pressurized air at a volume rate as establishes a vertically upwardly directed force on said boom, an orifice opening in each opposite side portion of said hollow boom adjacent said boom rear end and configured to discharge said boom contained pressurized air at a volume rate as establishes a horizontally extending force directed outwardly and transversely of said boom, means selectively opening and closing said oppositely located side orifice openings and means controlling the volume rate of air discharge from said orifice openings.

16. The fuel transfer device of claim 15 wherein said air volume rate control means comprises means controlling the air pressure generated by rotation of said fan.

17. The fuel transfer device of claim 16 wherein said fan has fixed pitch blades and said air volume rate control means comprises means controlling the speed of said fan rotating means.

18. The fuel transfer device of claim 16 wherein said fan has controllable pitch blades, said fan rotating means operates at a constant speed and said air volume rate control means comprises means for controlling the pitch of said fan blades.

* * * * *